(12) United States Patent
Linton et al.

(10) Patent No.: US 11,265,305 B2
(45) Date of Patent: Mar. 1, 2022

(54) MANAGING ANONYMOUS NETWORK CONNECTIONS

(71) Applicant: International Business Machines Corporation, Armonk, NY (US)

(72) Inventors: Jeb R. Linton, Manassas, VA (US); Naeem Altaf, Round Rock, TX (US); Sanjay Nadhavajhala, Cupertino, CA (US); Satya Sreenivas, Los Alamos, NM (US)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 16/509,949

(22) Filed: Jul. 12, 2019

(65) Prior Publication Data

US 2021/0014209 A1 Jan. 14, 2021

(51) Int. Cl.
*H04L 29/06* (2006.01)
*H04L 41/12* (2022.01)
*H04L 9/30* (2006.01)
*H04L 67/12* (2022.01)

(52) U.S. Cl.
CPC ............... *H04L 63/08* (2013.01); *H04L 9/30* (2013.01); *H04L 41/12* (2013.01); *H04L 67/12* (2013.01)

(58) Field of Classification Search
CPC ..... H04L 63/08; H04L 63/0407; H04L 41/12; H04L 9/30; H04L 9/3218; H04L 9/0825; H04L 9/3239; H04L 67/12; H04L 43/065; H04L 2209/38; H04L 2209/805; H04W 4/02; H04W 4/70
See application file for complete search history.

(56) References Cited

U.S. PATENT DOCUMENTS

| 9,600,571 B2 | 3/2017 | Shaashua et al. |
| 10,187,258 B2* | 1/2019 | Nagesh ................. H04W 4/70 |
| 2012/0023247 A1* | 1/2012 | Minamizawa ...... H04L 63/0407 |
| | | 709/229 |
| 2016/0087957 A1* | 3/2016 | Shah ...................... H04L 63/08 |
| | | 726/1 |

(Continued)

FOREIGN PATENT DOCUMENTS

GB 2473083 A 3/2011

OTHER PUBLICATIONS

Alcaide et al., "Anonymous authentication for privacy-preserving IoT target-driven applications", Computers & Security, vol. 37, Sep. 2013, pp. 111-123, Revised Mar. 3, 2013, Accepted May 31, 2013, Available online Jun. 11, 2013, <http://dx.doi.org/10.1016/j.cose.2013.05.007>.

(Continued)

*Primary Examiner* — Khoi V Le
(74) *Attorney, Agent, or Firm* — David K. Mattheis; Maeve M. Carpenter

(57) ABSTRACT

Managing anonymous network connections. In one aspect managing anonymous network connections by providing anonymous authentication credentials to a plurality of devices in a hierarchical network, registering a first set of devices at a first data aggregator, determining that the first set of devices at the first aggregator numbers less than a first threshold value, registering the first set of devices with a second aggregator upstream in the hierarchy from the first aggregator, causing data from the first set of devices to be received at the second aggregator.

17 Claims, 5 Drawing Sheets

(56) References Cited

U.S. PATENT DOCUMENTS

| | | | |
|---|---|---|---|
| 2016/0295401 A1* | 10/2016 | Berge | H04L 63/0407 |
| 2018/0227273 A1* | 8/2018 | Shumsker | H04M 3/2281 |
| 2019/0014048 A1* | 1/2019 | Krishna Singuru | H04L 67/12 |
| 2019/0191330 A1* | 6/2019 | Dao | H04L 12/4633 |

OTHER PUBLICATIONS

Bennati et al. "Privacy-enhancing Aggregation of Internet of Things Data via Sensors Grouping" (Submitted on Feb. 28, 2017 (v1), last revised Mar. 1, 2018 (this version, v4)), 31 pages, arXiv:1702.08817v4 [cs.DC] Mar. 1, 2018.

Bohli et al., "Security and Privacy Challenge in Data Aggregation for the IoT in Smart Cities," In: Internet of Things: Converging Technologies for Smart Environments and Integrated Ecosystems, pp. 225-244, © 2013 River Publishers, Denmark.

Dautov et al., "Hierarchical data fusion for Smart Healthcare", J. Big Data (2019) 6:19, 23 pages, < https://doi.org/10.1186/s40537-019-0183-6>.

Hu et al., "An Efficient Privacy-Preserving Data Aggregation Scheme for IoT", Wireless Algorithms, Systems, and Applications, WASA 2018, Lecture Notes in Computer Science, vol. 10874, pp. 164-176, 2018, <https://doi.org/10.1007/978-3-319-94268-1_14>.

Mell et al., "The NIST Definition of Cloud Computing", Recommendations of the National Institute of Standards and Technology, Special Publication 800-145, Sep. 2011, 7 pages.

Ning et al., "Aggregated-Proof Based Hierarchical Authentication Scheme for the Internet of Things," in IEEE Transactions on Parallel and Distributed Systems, vol. 26, No. 3, pp. 657-667, Mar. 2015.

Yang et al., "Towards Lightweight Anonymous Entity Authentication for IoT Applications", Australasian Conference on Information Security and Privacy, ACISP 2016, Part I, LNCS 9722, pp. 265-280, DOI: 10.1007/978-3-319-40253-6 16.

* cited by examiner

MANAGING ANONYMOUS NETWORK CONNECTIONS

BACKGROUND

The disclosure relates generally to aggregating data from anonymous networked devices. The disclosure relates particularly to managing anonymous network connections among Internet of Things devices connected to edge cloud resources.

The proliferation of smart devices connected to the Internet of Things (IoT) including smart appliance, power meters and other smart devices in homes, is accompanied by the creation of large quantities of data. Aggregating and analyzing this data could increase its value.

Anonymous credentials allow validated users to repeatedly access systems without sacrificing their privacy. Repeated connections by a single user are not linked to each other. Public Key Infrastructure can be enhanced with Zero Knowledge Proof cryptography to build anonymous credentials.

SUMMARY

Aspects of the invention disclose methods, systems and computer readable media associated with managing anonymous network connections. In one aspect managing anonymous network connections by providing anonymous authentication credentials to a plurality of devices in a hierarchical network, registering a first set of devices at a first data aggregator, determining that the first set of devices at the first aggregator numbers less than a first threshold value, registering the first set of devices with a second aggregator upstream in the hierarchy from the first aggregator, causing data from the first set of devices to be received at the second aggregator.

DETAILED DESCRIPTION

Figure 1:
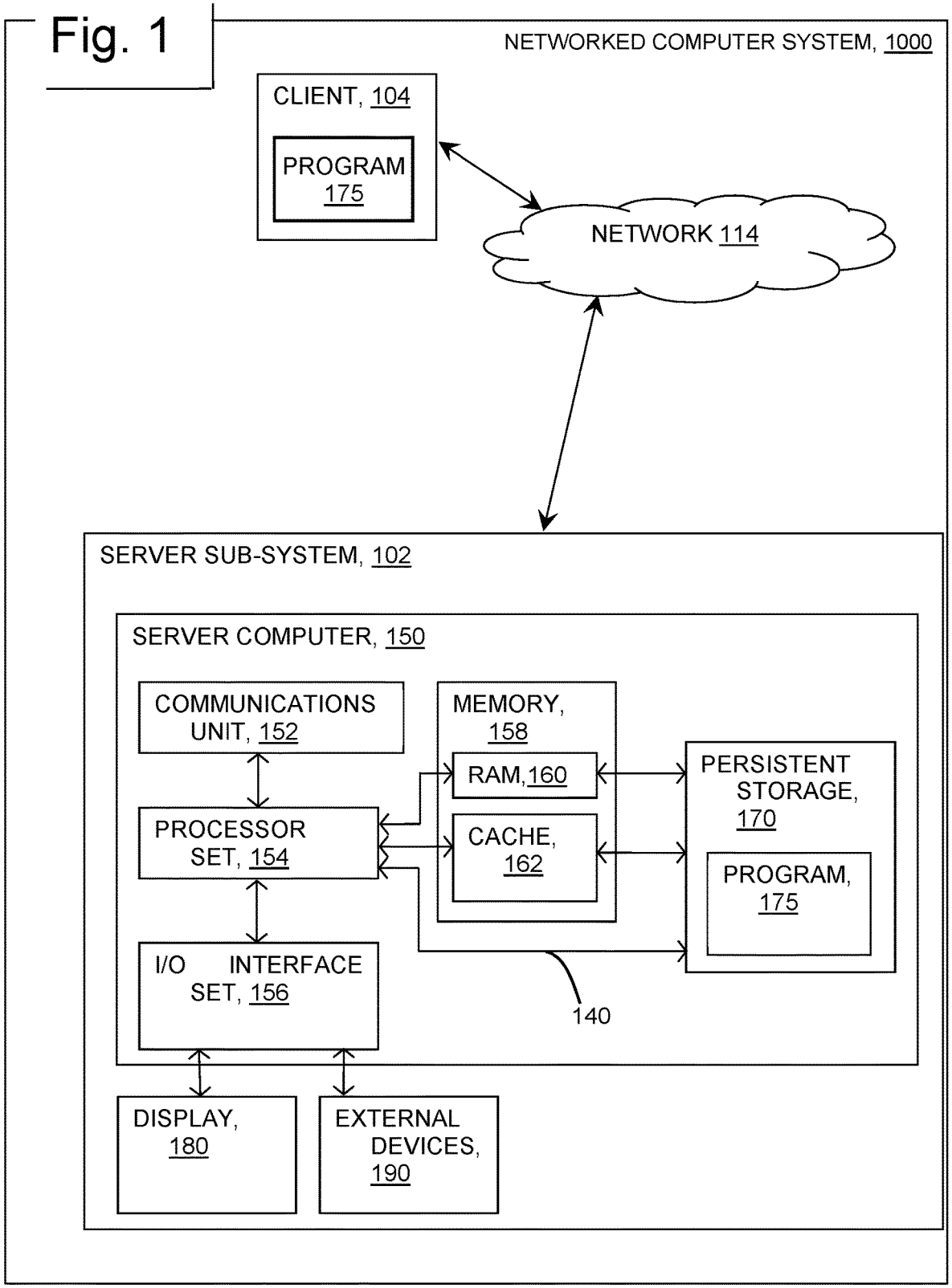
FIG. 1 provides a schematic illustration of a system, according to an embodiment of the invention.

Value can be added to IoT data through aggregation and analysis. Much IoT data is personal in nature and the collection, aggregation and analysis can raise data privacy concerns. Aggregated data can be anonymized, but aggregated and anonymized data can be de-anonymized under certain conditions. Aggregating data from anonymous devices can help protect device anonymity when data from a large enough number of devices is being aggregated. Aggregating data from too small a group of devices risks exposing the identity of the devices.

In an embodiment for aggregating data from anonymous networked devices, a plurality of new-to-the network individual devices are registered as part of an IoT network. The initial connection and registration can include a manual component such as a phone call, text message, email, or online registration process to provide information about the new device including location, ownership, etc. The connection can be a hardwired connection, or wireless connection using local wireless network technologies.

The network can be based upon geography where each successive level of the network hierarchy covers a larger geographic area than the lower level, where the larger geographic area includes the area of the lower levels of the hierarchy. Local networks associated with a small geographic region can be consolidated into a next level network including multiple local geographies, and regional networks consociating the next level networks and so on. The aggregators can be actual physical system elements or virtual aggregators defined on computational resources. For virtual aggregators, the same geographic limits can be defined for specific network addresses residing on a common server. Reporting endpoints are initially directed to a "local" aggregator based upon location information associated with the network hierarchy information carried in the device's credentials. As the devices need to move up or down stream in the hierarchy, the credential's network hierarchy is used to redirect the device to different aggregators.

Upon connecting, anonymous credentials are created by a centralized issuing element, and issued to the new device. In an embodiment, the anonymous credentials can relate to the class of the device, utility meter, appliance, or other IoT device. The anonymous credentials can include location information of the device. In an embodiment, the credentials include information regarding the aggregators for the device at multiple levels of the network hierarchy together with network addresses etc., for the respective aggregators. The anonymous credentials can include Zero-Knowledge unlinkable attribute-based credentials, allowing each device to be anonymously validated in communications with the network without repeated communications being associated with the device or each other. In an embodiment, the anonymous credentials of a disabled or inactive device can be revoked, preventing the device from reporting data.

In an embodiment, devices with credentials register with their local aggregator. The local aggregator verifies the credentials of the device. In an embodiment, the aggregator can cross-authenticate the device with all other reporting devices, ensuring that the device's credentials are valid. In an embodiment, a zk-SNARK program can be used to validate devices with appropriate credentials.

The local aggregator issues a session token to the registering device. In an embodiment, the session token of each device may be recorded in a registry of tokens together with the encrypted identifier of the device. The identifiers can be encrypted using a public-private key pair. Key pairs can be associated with utility providers, public authorities and other entities. Utility providers can use their key pair to monitor all devices serviced by the utility, but without identifying individual devices. Public authorities can use their key to monitor individual devices subject to legal protections of personal privacy and freedom from invasive searches without a warrant. In an embodiment, the credential can be structured such that the utility and the public authorities must be cooperate to access identified individual device level information. In an embodiment, the registry of tokens can be maintained in a distributed ledger such as a blockchain ledger, or a private ledger including a private blockchain ledger.

In an embodiment, the device uses the session token to register with each aggregator in its hierarchy beginning with the local aggregator and proceeding up through the hierarchy to the highest-level aggregator. The local aggregator and provides the current number of devices reporting to the aggregator. The device compares the current number of devices to its security threshold—the minimum number of reporting devices which is acceptable to the device. The device begins reporting data to aggregators under conditions where the device plus the current number of reporting devices meets or exceeds the security threshold. The security threshold can be zero or any positive integer. The security threshold can be uniform across the system, or can vary from device to device, by geographic area, by device classification, or a combination of these dimensions. The value can be fixed, set by the manufacturer, or by a utility, or may be set to a default with an option for a user to change the value. There can be an option for a user to disable reporting completely.

In an embodiment, endpoint devices continuously report data as long as they are registered to an aggregator having a number of reporting devices above the endpoint device's security threshold. In an embodiment, endpoint devices periodically (hourly, daily, weekly, etc.) report their data to a suitable aggregator.

In an embodiment, all endpoint devices are members of a single class and all report to a single set of aggregators. In an alternative embodiment, multiple device classes can be defined, electric meters, gas meters, smart appliances, smart thermostats, etc., all reporting to a single set of physical aggregators. In this embodiment, the level of aggregation can vary by class, classes having populations above their security threshold can report to a low, local level aggregator while classes having a local population below their threshold can report to a higher-level aggregator.

Under condition where the number of current reporting devices plus the new device falls below the security threshold, the new device checks in with the next level aggregator of the network. The device may have previously registered with a first level aggregator as described above or may register with the aggregator, using the anonymous credentials and session token from the local aggregator, at this time. The second, or next-level aggregator provides the device with the current number of device reporting data and the device compares this value plus one, to the security threshold. The device begins reporting data to the next-level aggregator under conditions where the current number of reporting devices plus the new device meets or exceeds the threshold. Under all other conditions, the device continues up the hierarchy until an aggregator is found with enough currently reporting devices that adding the new device will meet or exceed the security threshold of the device. In an embodiment, as or after the device begins reporting data to an appropriate aggregator, the device reports to each downstream aggregator with which the device is registered using its session token, that it is reporting to the identified upstream aggregator. In an embodiment, the device begins reporting to an upstream aggregator and the upstream aggregator uses the device's session token to report to all downstream aggregators which are subordinate to the upstream aggregator, that the upstream aggregator is collecting data from the device. In an embodiment, the device checks in or registers with upstream aggregators using the previously assigned session token but does not provide an indication of the downstream aggregator to which it was previously reporting data.

In an embodiment, each aggregator of the network periodically sends messages to IoT endpoint devices registered with the aggregator reporting the current population of reporting devices. Each endpoint device compares the current population data with its security threshold value and determines is the threshold is satisfied. In situations where the threshold is no longer satisfied, the device stops reporting data and searches upstream in the hierarchy for an aggregator having sufficient reporting endpoints. As endpoint devices cease reporting to an aggregator, new messages are sent providing updated reporting population information.

In an embodiment, reporting endpoints check the status of their current aggregator by sending a message asking for a response. Aggregators which have gone offline do not respond causing the endpoints to cease sending data and to search upstream for an available aggregator. After finding and connecting with an upstream aggregator, the endpoints begin reporting data to the upstream aggregator. The endpoints can store data between the time they cease and then resume reporting data, then sending the stored and current data to the new aggregator.

In an embodiment, downstream aggregators with no actively reporting endpoints, periodically send messages to the endpoint devices registered with the aggregator indicating the number of endpoints currently reporting to an upstream aggregator. If that number satisfies an endpoint's security threshold, the endpoint then responds to the downstream aggregator that the endpoint is ready to move. The downstream aggregator reports the number of "ready to move" responses to the endpoints which in turn begin reporting data to the downstream aggregator after their respective security thresholds are satisfied by the ready to move response number. This process can also be used as new aggregators are added to the network.

In an embodiment, the lowest level aggregators of the hierarchical network are issued anonymous credentials similar to those of the endpoint devices. In this embodiment, the endpoint devices register anonymously with their local aggregator which in turn registers anonymously with an upstream aggregator. The lowest level aggregators evaluate the number of aggregators reporting to the upstream aggregators and report data from the endpoint devices when it is at or above the security threshold of the lowest level aggregator. When the number is below the threshold, the lowest level aggregator stops reporting data and evaluates aggregators further upstream until one with sufficient data traffic is found. The lowest level aggregator then resumes reporting data to the new upstream aggregator. In this embodiment, the endpoint devices remain registered with the lowest level aggregator and continue to report data to that aggregator.

FIG. 1 provides a schematic illustration of exemplary network resources associated with practicing the disclosed inventions. The inventions may be practiced in the systems and processors of any of the disclosed elements which process an instruction stream. As shown in the figure, a networked IoT endpoint device 104, connects wirelessly to server sub-system 102 via network 114. Client device 104 comprises data aggregation program 175, together with sufficient computing resource (processor, memory, network communications hardware) to execute the program. Server sub-system 102 includes data aggregation program 175, and is representative of system data aggregators as well as the centralized credential issuing element. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the data aggregation program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing device 104. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., data aggregation program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
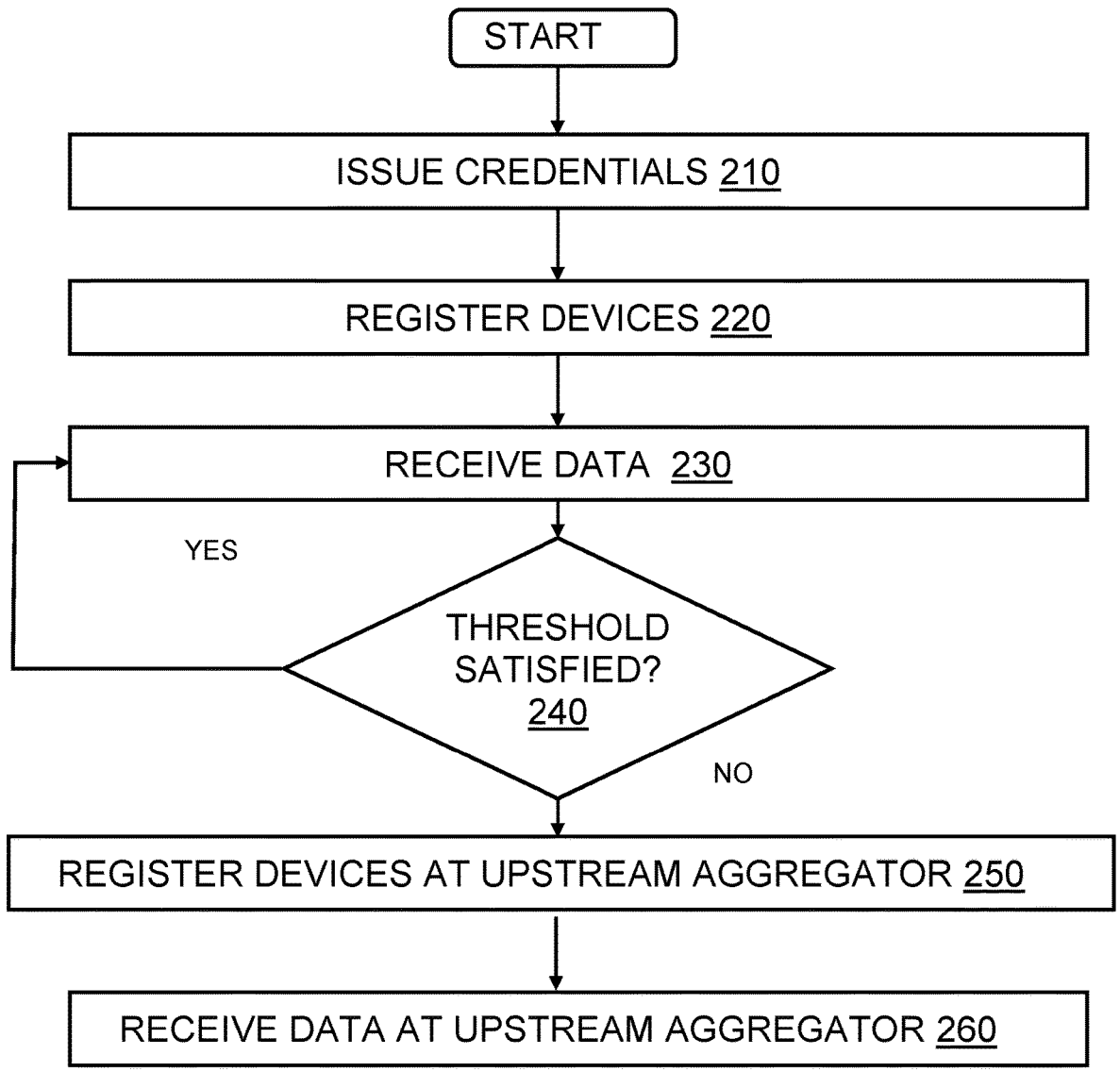
FIG. 2 provides a flowchart depicting an operational sequence, according to an embodiment of the invention.

FIG. 2 provides a flowchart 200, illustrating exemplary activities associated with the practice of the disclosure. After program start, anonymous credentials are issued to a plurality of devices by a centralized credentialing element portion of data aggregation program 175 at 210. Credentialing can be distributed such that each low-level aggregator issues credentials under the direction of the centralized issuing element of data aggregation program 175 to prevent duplication of credentials. In such an embodiment, the centralized issuing element of data aggregation program 175 communicates the next available credentials and each low-level aggregating element checks out credentials for each new endpoint connected to the network. The anonymous credentials are received by new devices which then use the credentials to register the devices at data aggregators under data aggregation program 175 at 220. The data aggregation program 175 provides each registered device with a session token. The registered devices can communicate their security thresholds to the data aggregation program 175 at registration. Data aggregation program 175 then begins receiving data from the endpoint devices at 230. At 240 data aggregation program 175 determines that the number of reporting endpoint devices at an aggregator is below a defined threshold. The determination can be made at the device after receiving a message from the local aggregator indicating the current reporting device population at the aggregator. The determination can be made at the aggregator after evaluating the current reporting device population according to the security thresholds of the reporting devices, and then communicated to the reporting devices. After the determination, the reporting devices check in with an upstream aggregator to determine if the security threshold of the device is satisfied at that aggregator. At 250 data aggregation program 175 registers the endpoint devices with an upstream aggregator and the upstream aggregator begins receiving data from the endpoint devices at 260. The devices can be registered at all aggregators from their initial network interaction, in such an embodiment, the devices transfer from one aggregator to another and report data to the latter aggregator after the transfer is complete.

Figure 3:
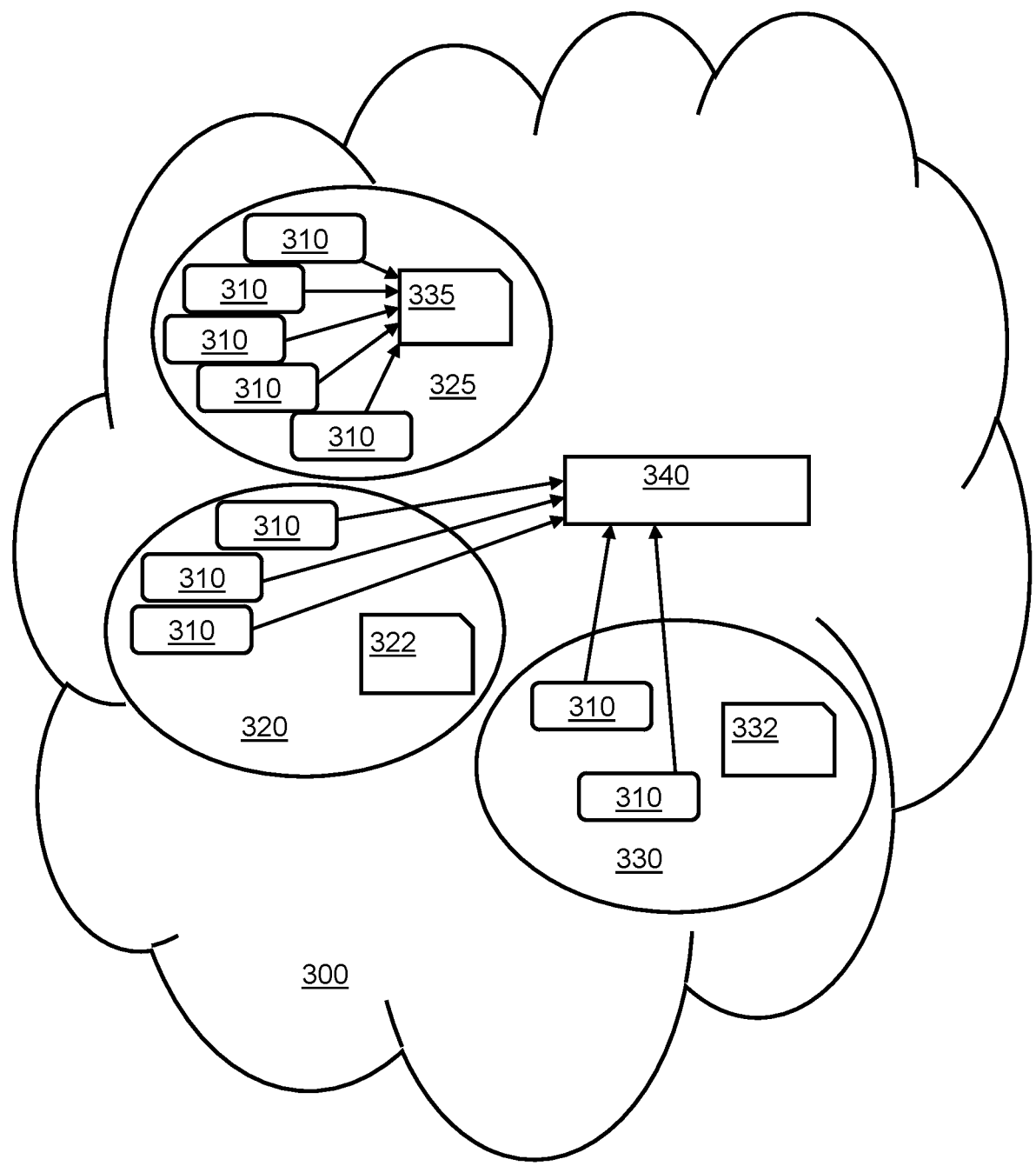
FIG. 3 depicts a generalized architecture of the system elements, according to an embodiment of the invention.

FIG. 3 provides an illustration of the overall architecture 300, of systems of the invention. As shown in the figure, endpoint devices 310, in neighborhood 325 report data to downstream aggregator 335. The security threshold of endpoint devices 310 is 5 in this example. Endpoint devices 310 in neighborhoods 320 and 330, also have a security threshold of 5 and therefore report their data to upstream aggregator 340. Downstream aggregators 322 and 332, are idle in the example as there are less than the security thresholds of endpoint devices 310 currently reporting in each of neighborhoods 320 and 330.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
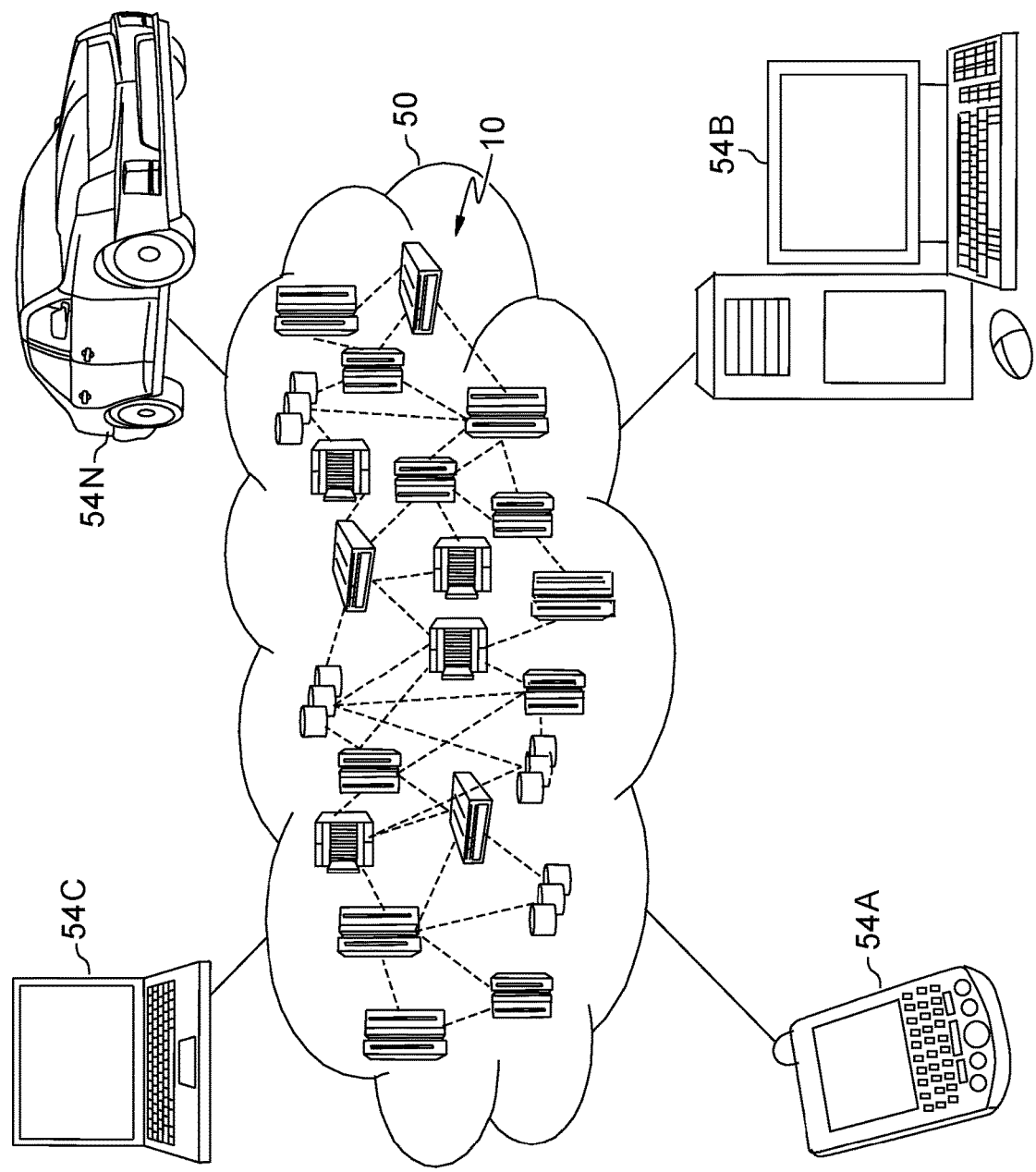
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
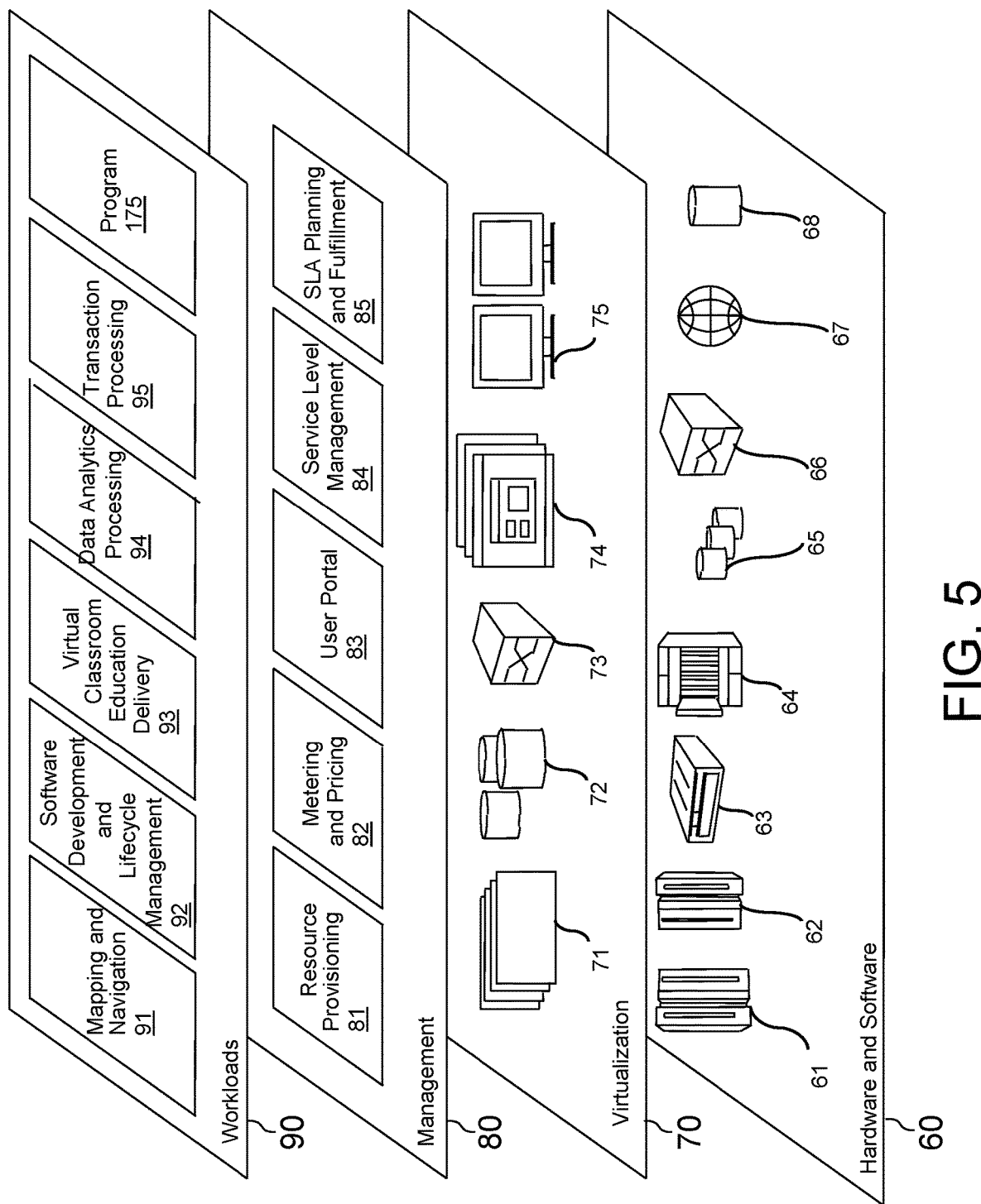
FIG. 5 depicts abstraction model layers, according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data aggregation program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper", "lower", "right", "left", "vertical", "horizontal", "top", "bottom", and derivatives thereof shall relate to the disclosed structures and methods, as oriented in the Figures. The terms "overlying", "atop", "positioned on" or "positioned atop" mean that a first element, such as a first structure, is present on a second structure, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for managing anonymous network connections, the method comprising:
   providing, by one or more computer systems, anonymous authentication credentials to a plurality of devices in a hierarchical network;
   registering, by the one or more computer systems, a first set of devices of the plurality of devices with a first data aggregator;
   determining, by the one or more computer systems, that the first set of devices registered with the first data aggregator numbers less than a first threshold value;
   in response to the determining, registering, by the one or more computer systems, the first set of devices with a second data aggregator, wherein the second data aggregator is upstream from the first data aggregator in the hierarchical network;
   wherein registering the first set of devices with the second data aggregator causes data from the first set of devices to be received at the second data aggregator;
   ceasing to send updated aggregation population data from the first data aggregator;
   sending valid aggregation population data from a new data aggregator; and
   receiving data at the new data aggregator.

2. The computer implemented method according to claim 1, further comprising:
   determining, by the one or more computer systems, that a second set of devices registered with the second data aggregator exceeds a second threshold value; and
   registering at least a portion of the second set of devices with the first data aggregator;
   wherein registering at least a portion of the second set of devices with the first data aggregator causes data from the portion of the second set of devices to be received at the first data aggregator.

3. The computer implemented method according to claim 1, wherein the authentication credentials relate to at least one of a location and a device class.

4. The computer implemented method according to claim 1, wherein the second data aggregator covers a larger geographic area than the first data aggregator.

5. The computer implemented method according to claim 1, further comprising:

providing, by the one or more computer systems, a registry of session tokens associated with the plurality of devices, wherein the registry includes individual device identifiers encrypted using a public key.

6. The computer implemented method according to claim 1, further comprising registering, by the one or more computer systems, devices at each level of a hierarchy.

7. A computer program product for managing anonymous network connections, the computer program product comprising one or more computer readable storage devices and stored program instructions on the one or more computer readable storage devices, the stored program instructions comprising:
   program instructions for providing anonymous authentication credentials to a plurality of devices in a hierarchical network;
   program instructions for registering devices at a first data aggregator;
   program instructions for determining that a first set of devices at the first data aggregator, numbers less than a first threshold value;
   program instructions for registering the first set of devices with a second data aggregator in response to the determining, wherein the second data aggregator is upstream from the first data aggregator in the hierarchical network;
   wherein registering the first set of devices with the second data aggregator causes data from the first set of devices to be received at the second data aggregator;
   program instructions for ceasing to send updated aggregation population data from the first data aggregator;
   program instructions for sending valid aggregation population data from a new data aggregator; and
   program instructions for receiving data at the new data aggregator.

8. The computer program product according to claim 7, the stored program instructions further comprising:
   program instructions for determining that a second set of devices registered with the second data aggregator exceeds a second threshold value; and
   program instructions for registering at least a portion of the second set of devices with the first data aggregator;
   wherein registering at least a portion of the second set of devices with the first data aggregator causes data from the portion of the second set of devices to be received at the first data aggregator.

9. The computer program product according to claim 7, wherein the authentication credentials relate to at least one of a location and a device class.

10. The computer program product according to claim 7, wherein the second data aggregator covers a larger geographic area than the first data aggregator.

11. The computer program product according to claim 7, the stored program instructions further comprising:
   program instructions for providing a registry of session tokens associated with the plurality of devices, wherein the registry includes individual device identifiers encrypted using a public key.

12. The computer program product according to claim 7, the stored program instructions further comprising program instructions for registering devices at each level of a hierarchy.

13. A computer system for managing anonymous network connections, the computer system comprising:
   one or more computer systems;
   one or more computer readable storage devices; and
   stored program instructions on the one or more computer readable storage devices for execution by the one or more computer systems, the stored program instructions comprising:
   program instructions for providing anonymous authentication credentials to a plurality of devices in a hierarchical network;
   program instructions for registering devices at a first data aggregator;
   program instructions for determining that a first set of devices at the first data aggregator, numbers less than a first threshold value;
   program instructions for registering the first set of devices with a second data aggregator in response to the determining, wherein the second data aggregator is upstream from the first data aggregator in the hierarchical network;
   wherein registering the first set of devices with the second data aggregator causes data from the first set of devices to be received at the second data aggregator;
   program instructions for ceasing to send, by the one or more computer systems, updated aggregation population data from the first data aggregator;
   program instructions for sending valid aggregation population data from a new data aggregator; and
   program instructions for receiving data at the new data aggregator.

14. The computer system according to claim 13, the stored program instructions further comprising:
   program instructions for determining that a second set of devices registered with the second data aggregator exceeds a second threshold value; and
   program instructions for registering at least a portion of the second set of devices with the first data aggregator;
   wherein registering at least a portion of the second set of devices with the first data aggregator causes data from the portion of the second set of devices to be received at the first data aggregator.

15. The computer system according to claim 13, wherein the authentication credentials relate to at least one of a location and a device class.

16. The computer system according to claim 13, wherein the second data aggregator covers a larger geographic area than the first data aggregator.

17. The computer system according to claim 13, the stored program instructions further comprising:
   program instructions for providing a registry of session tokens associated with the plurality of devices, wherein the registry includes individual device identifiers encrypted using a public key.

* * * * *